(12) United States Patent
de los Reyes et al.

(10) Patent No.: US 9,821,274 B1
(45) Date of Patent: Nov. 21, 2017

(54) HYBRID DIAFILTRATION SYSTEM AND METHODS

(71) Applicant: SPF Innovations, LLC, Belmont, MA (US)

(72) Inventors: Gaston de los Reyes, Somerville, MA (US); Leon Mir, Brookline, MA (US)

(73) Assignee: SPF INNOVATIONS LLC, Somerville, MA (US)

( * ) Notice: Subject to any disclaimer, the term of this patent is extended or adjusted under 35 U.S.C. 154(b) by 345 days.

(21) Appl. No.: 14/616,696

(22) Filed: Feb. 7, 2015

Related U.S. Application Data (60) Provisional application No. 61/937,544, filed on Feb. 9, 2014.

(51) Int. Cl.
| | | |
|---|---|---|
| *B01D 61/22* | (2006.01) | |
| *B01D 61/18* | (2006.01) | |
| *B01D 61/16* | (2006.01) | |
| *B01D 61/58* | (2006.01) | |
| *B01D 61/32* | (2006.01) | |
| *B01D 61/24* | (2006.01) | |

(52) U.S. Cl.
CPC ........... *B01D 61/32* (2013.01); *B01D 61/243* (2013.01); *B01D 2311/25* (2013.01); *B01D 2313/19* (2013.01); *B01D 2315/16* (2013.01)

(58) Field of Classification Search
CPC .. B01D 61/32; B01D 61/243; B01D 2315/16; B01D 2313/19; B01D 2311/25
See application file for complete search history.

(56) References Cited

U.S. PATENT DOCUMENTS

| | | | |
|---|---|---|---|
| 4,752,425 A * | 6/1988 | Martin ................. | A61K 9/1277 264/4.6 |
| 5,597,486 A * | 1/1997 | Lutz ..................... | A23C 9/1422 210/639 |
| 7,141,171 B2 | 11/2006 | Lightfoot | |
| 7,384,549 B2 | 6/2008 | De Los Reyes et al. | |
| 7,431,837 B2 | 10/2008 | Cohee et al. | |
| 7,510,654 B2 | 3/2009 | Mir et al. | |
| 2002/0053540 A1 | 5/2002 | Collins et al. | |
| 2002/0170859 A1* | 11/2002 | Kopf .................... | B01D 15/361 210/635 |
| 2003/0229212 A1* | 12/2003 | Fahrner .................... | C07K 1/18 530/417 |
| 2007/0151925 A1* | 7/2007 | de los Reyes ......... | B01D 61/14 210/641 |
| 2009/0277833 A1* | 11/2009 | Mir ...................... | B01D 61/145 210/637 |
| 2012/0294836 A1 | 11/2012 | Rowley et al. | |
| 2014/0374352 A1* | 12/2014 | Brantley ................ | B01D 61/58 210/641 |

\* cited by examiner

*Primary Examiner* — Pamela H Weiss
(74) *Attorney, Agent, or Firm* — Barry Gaiman (57) ABSTRACT

A hybrid diafiltration system includes an intermediate tank, a feed pump and a single-pass concentration (SPC) module, feed and product flow diverting valves to affect a multi-step concentration, wash and final-concentration process with fewer recirculation passes than conventional systems.

9 Claims, 4 Drawing Sheets

HYBRID DIAFILTRATION SYSTEM AND METHODS

CROSS REFERENCE TO RELATED APPLICATIONS

This application claims the benefit of U.S. provisional patent application Ser. No. 61/937,544 entitled "HYBRID DIAFILTRATION SYSTEM AND METHODS," filed Feb. 9, 2014. This application is also related to U.S. Pat. No. 7,384,549 issued Jun. 10, 2008, application Ser. No. 11/615,028 filed Dec. 22, 2006 entitled "METHOD AND APPARATUS FOR THE FILTRATION OF BIOLOGICAL SOLUTIONS" which describes some of the properties of single-pass filtration (SPF) modules. The entire teachings and contents of these Patent Applications and issued Patents are hereby incorporated by reference herein in their entireties.

FIELD OF THE INVENTION

The present disclosure relates to devices for combined diafiltration and single-pass filtration.

BACKGROUND OF THE INVENTION

A common goal of filtration processes is to reduce the concentration of low molecular weight compounds in a fluid by permeating a portion of the fluid through a semi-permeable membrane. Said membrane has pores that are large enough to permit the permeation of the low molecular weight compounds but small enough to preclude the permeation of the high molecular weight compounds included in said fluid. Most commonly, the said permeation process is carried out by the application of a pressure to the fluid being processed to induce permeation of a portion of the solvent and the low molecular weight compounds.

It is common to carry out these types of processes by adding a suitable diluent, free of the target contaminants, to fluid being processed at the same rate as the rate of permeation. By this means the concentration of the high molecular weight compounds is substantially constant during the course of the process. In general the rate of permeation in a filtration process is controlled by the concentration of the high molecular weight compounds. In order to minimize the amount of membrane area needed to achieve a specified decontamination factor the process is carried out an optimum concentration of the high molecular weight compounds. This process of filtration accompanied by the addition of a diluent is known as diafiltration, and the diluent is called diafiltrate. Diafiltration is commonly used in the purification of biomolecules to reduce low molecular weight contaminants as well as to replace the buffer used to dissolve the target biomolecule.

There are two common methods of carrying out diafiltration processes. These are described in various monographs, for example, "Ultrafiltration and Microfiltration," Munir Cheryan (1998) pp. 3012-3018. The batch processes uses a fixed volume of fluid contained in vessel. The fluid is circulated from the vessel through a membrane module and back to vessel, while adding diluent to the vessel to replace the fluid permeated. When the rate of addition of diafiltrate is the same as the rate of permeation the process is commonly referred to as "constant volume diafiltration." A standard material balance on the low molecular weight compounds yields the following prediction for the decontamination factor, $DF_B$.

$$DF_B = e^{(1-R)\frac{V_{df}}{V_{ret}}} \quad (1)$$

In this equation $V_{df}$ is the total volume of diluent or diafiltrate used to achieve the specified decontamination factor and $V_{ret}$ is the (constant) volume of solution processed.

The second common process uses a series of interconnected stages. The fluid being purified passes from stage to stage. In each stage diafiltrate is added at a rate equal to the permeation in that stage. The decontamination factor, $DF_C$, for this process is given by the following equation.

$$DF_c = \left(1 + (1-R)\frac{V_{df \cdot S}}{V_{ret \cdot S}}\right)^2 \quad (2)$$

Where $V_{df \cdot S}$ and $V_{ret \cdot S}$ are the volumes of diluent and retentate that have passed through a stage in the course of the process. A comparison of the two processes carried out at equal values of the retentate volumes yields the following equation for the ratio of diafiltrate volumes at equal decontamination factors, DF.

$$\frac{V_{df \cdot S}}{V_{df \cdot B}} = N\frac{\left[(DF)^{\frac{1}{N}} - 1\right]}{\ln(DF)} \quad (3)$$

Equation (3) shows that the staged process generally requires more diafiltrate, which means that it requires more membrane area to process a given volume of material in a fixed period of time. Only with a large number of stages is the amount of additional diafiltrate not significantly more than that required for a batch diafiltration process. However, the resulting system would be expensive on account of the increased number of stages and the complexity and large number of interconnections between stages.

In summary, constant volume diafiltration processes are used when buffer consumption and the size of the membrane modules required to perform the process need to be minimized, whereas staged processes are used where there is a need for short residence times and the lack of space for large batch (recirculation) tanks. Batch diafiltration processes are typically used in biopharmaceutical processing to reduce buffer consumption and minimize the amount of membrane area required.

U.S. Pat. No. 7,384,549, mentioned above, discloses single-pass TFF modules with and without internal diafiltration distribution, suitable for single-pass concentration and single-pass diafiltration processes, respectively (hereafter called "single-pass concentration modules" and "single-pass diafiltration modules"). Single-pass diafiltration modules offer the benefits of staged diafiltration systems as described above (low residence time of the fluid being processed and no recirculation loop), but without the complexity of a staged system. However, single-pass diafiltration modules are still more complex than single-pass concentration modules, and for that reason are not yet commercially available. Therefore initial applications of single-pass TFF technology have been limited to concentration processes and have not included diafiltration processes.

BRIEF SUMMARY OF THE INVENTION

Embodiments disclosed herein combine the features of batch diafiltration with those of single-pass concentration processes by utilizing a single-pass concentration module for both the concentration and diafiltration steps. Systems and processes that utilize a single-pass concentration module for combined concentration and diafiltration processes are referred to as hybrid diafiltration systems and hybrid diafiltration processes, respectively. The systems and processes disclosed herein provide the benefits of batch multi-pass diafiltration and continuous single-pass concentration with the additional flexibility of being able to incorporate batch multi-pass concentration steps.

In one embodiment, a hybrid diafiltration system includes a single-pass concentration (SPC) module having a feed port, a retentate port and a permeate port, a feed pump having an inlet and an outlet, the outlet coupled to the feed port, an intermediate tank having an outlet and an inlet, the outlet fluidly coupled to the feed pump, a product valve having an inlet and a plurality of outlets, the inlet fluidly coupled to retentate port of the single-pass concentration module and one of the plurality of outlets coupled to the inlet of the intermediate tank and another one of the plurality of outlets coupled to a product stream. In this embodiment, the product valve switchably couples the retentate port of the single-pass concentration module to one of: the inlet of the intermediate tank and the product stream the system further includes a diafiltration source fluidly coupled to the recirculation loop of the hybrid diafiltration system.

Such a system extends the use of single-pass concentration modules to batch diafiltration processes, combining the benefits of batch diafiltration and single-pass concentration: low buffer consumption, low membrane area, low number of passes through the feed pump, and high concentration factors. Hybrid diafiltration systems enable users to achieve very high decontamination factors even for fluids with high viscosity or low fluxes, as well as high concentration factors in single-pass mode. In other embodiments, the diafiltration source includes a diafiltration valve switchably coupling the diafiltration source to one of: the feed port of the SPC module, the retentate port of the SPC module, the intermediate tank and the inlet of the feed pump.

In another embodiment, the system of claim 1 further includes a retentate pump disposed between the retentate port and the inlet of the product valve. In still another embodiment, the feed pump and the retentate pump are coupled by a Flow Ratio Controller (FRC). In one embodiment, the system further includes a product tank coupled to the product stream and the diafiltration source comprises a diafiltration pump switchably coupling a diafiltration tank to the recirculation loop of the system, and the product valve switchably couples the retentate port of the SPC module to the product tank.

In another embodiment, the system further includes a feed valve having a plurality of feed valve inlets and an outlet, the outlet coupled to the feed pump and the feed valve switchably couples the inlet of the feed pump to one of: a feed source coupled to one of the plurality of feed valve inlets and the intermediate tank outlet coupled to another one of the plurality of feed valve inputs.

In yet another embodiment, the system further includes a feed valve having inlets and an outlet, the outlet coupled to the feed pump, a feed tank coupled to an inlet of the feed valve, a product tank coupled to an outlet of the product valve. In this embodiment the diafiltration source comprises a diafiltration pump switchably coupling a diafiltration tank to the recirculation loop, the product valve switchably couples the retentate port of the SPC module to one of: the product tank and the intermediate tank, and the feed valve switchably couples the inlet of the feed pump to one of: the feed tank and the intermediate tank.

A technique for concentration and washing of a feed stream includes providing a hybrid diafiltration system having: a single-pass concentration (SPC) module having a feed port, a retentate port and a permeate port, a feed pump having an inlet and an outlet, the outlet coupled to the feed port, an intermediate tank having an outlet and an inlet, the outlet fluidly coupled to the feed pump, a product valve having an inlet and a plurality of outlets, the inlet fluidly coupled to the retentate port of the SPC module and one of the plurality of outlets coupled to the inlet of the intermediate tank and another one of the plurality of outlets coupled to a product stream, the product valve switchably couples the retentate port of the SPC module to one of: the inlet of the intermediate tank and the product stream and a diafiltrate source fluidly coupled to a recirculation loop of the system. The technique further includes loading a portion of the feed stream into the system accumulating retentate in the intermediate tank and washing a portion of the accumulated retentate by: adding diafiltrate and recirculating the portion of the accumulated retentate through the SPC module. Such a technique provides the benefits of single-pass concentration and batch diafiltration processes by the use of a single SPC module and combining continuous steps in single-pass mode and batch steps in multi-pass recirculation mode.

In a further embodiment, loading a portion of the feed stream into the system includes loading the portion of the feed stream into the intermediate tank. In another embodiment, the technique includes concentrating the washed portion of accumulated retentate in the intermediate tank in single-pass mode to a predetermined final concentration with retentate from the SPC module collected as the product stream. In another embodiment, the technique includes post-wash concentrating by recirculating the washed portion of accumulated retentate through the SPC module in recirculation mode without adding diafiltrate.

In another embodiment, the system further includes a feed valve and the technique includes loading the portion of the feed stream from outside the system through the feed valve and initially concentrating a portion of the feed stream in single-pass mode prior to washing without adding diafiltrate.

In yet another embodiment, the technique includes pre-wash concentrating the loaded portion of the feed stream in recirculation mode. In another embodiment, the technique includes post-wash concentrating the washed portion of accumulated retentate in recirculation mode without adding diafiltrate. In another embodiment, the technique includes pre-wash concentrating by recirculating the loaded portion of the feed stream through the SPC module without adding diafiltrate. In still another embodiment the system further includes a retentate pump and, the technique includes controlling a flow ratio between the feed pump and the retentate pump.

In another embodiment, the technique includes adjusting the concentration of the washed portion of accumulated retentate of the intermediate tank to a predetermined intermediate concentration while adding the diafiltrate at a non-constant volume to change the concentration of the washed portion of accumulated retentate of the intermediate tank. In yet another embodiment, the technique includes operating the hybrid diafiltration system with a conversion rate of greater than about 33 percent. It is understood that in addition to constant volume diafiltration operation, embodiments disclosed herein can operate with a varying batch volume during the diafiltration or washing step.

BRIEF DESCRIPTION OF THE FIGURES

The foregoing and other aspects, embodiments, objects, features and advantages of the present teachings can be more fully understood from the following description in conjunction with the accompanying figures. In the figures, like reference characters generally refer to like features and structural elements throughout the various figures. The figures are not necessarily to scale, emphasis instead being placed upon illustrating the principles of the present teachings. The following figures are illustrative of embodiments of the invention and are not meant to limit the scope of the invention as encompassed by the claims.

DETAILED DESCRIPTION OF THE INVENTION

It has been surprisingly discovered that a single-pass concentration module (hereinafter "SPC module") can be used to effect batch diafiltration processes, and in doing so consume approximately the same amount of buffer as conventional TFF modules but with fewer pump passes. A process using fewer pump passes is advantageous and particularly so when processing sensitive biomolecules, as most sensitive biomolecules degrade every time they pass through a pump due to the high shear conditions encountered in pumps. Conventional thinking indicated that SPC modules were not capable of being used effectively in recirculation loops with batch processing. Conventional thinking notwithstanding, systems and processes disclosed herein exploit the benefits of commercially available single-pass concentration modules in diafiltration processes.

Additionally, when diafiltration (washing) is performed with a SPC module, the same module can be used to affect batch concentration (in recirculation mode as explained below) and single-pass concentration, which enables very high concentration factors as well as fewer pump passes. The hybrid diafiltration systems and processes disclosed herein combine diafiltration, (batch) concentration and single-pass concentration steps for superior concentration/washing processes having fewer pump passes and very high final concentration, which is not possible with conventional batch concentration and diafiltration processes.

Several embodiments disclosed herein combine the benefits of batch diafiltration processes (e.g., low buffer consumption and higher permeation rate) and the benefits of single-pass concentration processes (e.g., low number of passes through the feed pump and high final concentration with high yield). Embodiments disclosed herein can operate with various SPC module designs such as spiral wound SPC modules, hollow fiber SPC modules, or plate and frame SPC modules (e.g., Cadence™ modules sold by Pall Corporation, Port Washington, N.Y.).

Figure 1A:
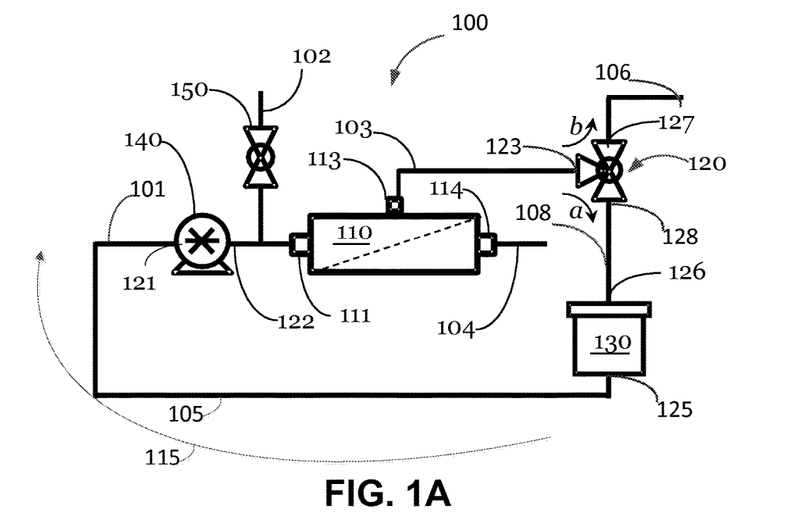
FIG. 1A shows a Process and Instrument Diagram ("P&ID") of a hybrid diafiltration system having an intermediate tank, a product valve, a diafiltrate valve and a feed pump according to one embodiment disclosed herein.

Now referring to FIG. 1A a hybrid diafiltration system 100 includes a SPC module 110 having a feed port 111, a retentate port 113 and a permeate port 114. The system 100 further includes a feed pump 140 having an inlet 121 and an outlet 122, the outlet 122 coupled to the feed port 111, an intermediate tank 130 having an outlet 125 and an inlet 126, the outlet 125 fluidly coupled to the feed pump 140, a product valve 120 having an inlet 123 and a plurality of product valve outlets 127-128, the inlet 123 fluidly coupled to retentate port 113 of the SPC module and one of the plurality of outlets 128 coupled to the inlet 126 of the intermediate tank 130 and another one of the plurality of outlets 127 coupled to a product stream 106. The system 100 includes a recirculation loop indicated here by feed 101, retentate 103, diverted retentate 108 into the intermediate tank 130 and recirculation stream 105 connection back to the feed pump 140. The recirculation loop generally refers to the fluid loop including components and connections used to recirculate the fluid in intermediate tank 130 back to the feed pump 140 as indicated by arrow 115 (referred to as recirculation loop 115). The system 100 further includes a diafiltration source 102 fluidly coupled into the recirculation loop of the system 100, in this embodiment the diafiltration source 102 is coupled into the recirculation loop at the feed port 111 of the SPC module 110. In one embodiment, the diafiltration source 102 includes a diafiltration valve 150 switchably coupling the diafiltration source 102 to the feed port 111 of the SPC module 110.

In one embodiment, a SPC module includes TFF modules that effect a high conversion, and therefore, is useful for performing single-pass concentration processes. In other embodiments, a SPC module include modules, for example, disclosed in U.S. Pat. No. 7,384,549. In still other embodiments, less efficient single-pass TFF modules (e.g., two equal area staged modules in series) can be used in hybrid diafiltration systems described below in more detail, and in still other embodiments a single conventional TFF module (i.e., not a SPC module) may be used with the hybrid diafiltration systems and processes disclosed below. It is understood that hybrid diafiltration systems and processes disclosed herein will perform better with properly designed SPC modules than SPC modules with two equal area staged modules in series. The superior performance of the properly designed SPC modules notwithstanding, the hybrid diafiltration processes disclosed herein can be advantageously used to combine the benefits of batch diafiltration and single-pass concentration processes even when using a single conventional TFF module which is not considered an SPC module.

The amount of conversion (also referred to as simply "conversion" or "conversion rate") generally means the fraction of the feed stream that is permeated through the module in a single-pass. Another similar measure of the amount of conversion of a single-pass concentration module is the concentration factor in a single-pass, measured as the ratio of the feed flow rate to the retentate flow rate. Properly designed single-pass concentration modules for hybrid diafiltration generally have conversions that exceed twenty percent (i.e., the concentration factor exceeds 1.25); in some embodiments the conversion preferably exceeds 33 percent (i.e., the concentration factor exceeds 1.5); in still other embodiments the conversion preferably exceeds 50 percent (i.e., the concentration factor exceeds 2.0); and in still other embodiments the conversion exceeds 67 percent (i.e., the concentration factor exceeds 3.0). The conversion of a SPC module depends on the design of the SPC module and the feed flow rate into the SPC module.

In operation, the product valve 120 switchably couples the retentate port 113 of the SPC module 110 to one of the inlet 126 of the intermediate tank 130 and the product stream 106. In one embodiment, the product valve 120 is a three-way flow diverter valve. In general, the hybrid diafiltration process includes six streams: feed stream 101 (also referred to as feed 101), pressurized diafiltrate stream 102 (also referred to as diafiltrate source 102 or simply diafiltrate 102), retentate stream 103 (also referred to as retentate 103), permeate stream 104 (also referred to as permeate 104), recirculation stream 105 and product stream 106 (also referred to as product 106). Streams 101, 103 and 105 partially form the recirculation loop.

In one embodiment, the product valve 120 has two states or positions:

position "a" (hereafter "POS a"), which diverts the retentate 103 into the intermediate tank 130, and position "b" (hereafter "POS b"), which diverts the retentate 103 to the effluent of the hybrid diafiltration system, the product 106. The output of the intermediate tank 130 forms the recirculation stream 105. The diafiltration valve 150 also has two states or positions: OPENED or CLOSED, for feeding the diafiltrate 102 into the SPC module 110 during a washing (also referred to as diafiltration) step, or otherwise shutting it off to effect a concentration step, respectively. It is understood that the diafiltrate 102 can be introduced immediately upstream of the SPC module 110 as shown in the figures included here, or anywhere else in the recirculation loop. (e.g., into feed 101, retentate 103, recirculation stream 105 and inlet 126 of the intermediate tank 130). The recirculation loop is used to recirculate the fluid in the intermediate tank 130 whenever the system is operated in recirculation mode (described below). Permeate 104 and product 106 may be at atmospheric pressure, or alternatively, they may be pressurized. The feed pump 140, in one embodiment, a centrifugal pump, is turned ON during operation except when loading the feed batch into intermediate tank 130 as described below. An optional valve (not shown) on retentate 103 may be used to increase the retentate pressure and control the permeation rate; alternatively, the recirculation loop may be pressurized, in which case the intermediate tank 130 would be pressurized. In other embodiments both a retentate valve and a pressurized recirculation loop may be used.

Figure 1B:
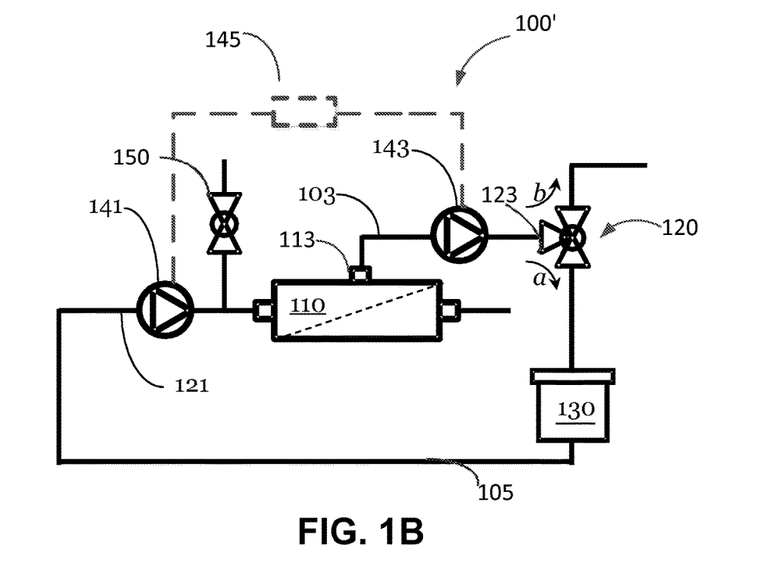
FIG. 1B shows a P&ID of the hybrid diafiltration system of FIG. 1A further including a retentate pump.

Now referring to FIG. 1B, a hybrid diafiltration system 100', similar to the hybrid diafiltration system 100 of FIG. 1A includes a retentate pump 143 disposed between the retentate port 113 and the inlet 123 of the product valve 120. In one embodiment, the system 100' optionally includes a Flow Ratio Controller (FRC) 145 which couples the operation of feed pump 141 and the retentate pump 143. The FRC 145 controls a ratio of the flow rate of the feed and retentate by positively controlling the feed pump 141 and the retentate pump 143. System 100' is capable of effecting Processes 1A and 1B as described above, with the added benefit of controlling the conversion SPC module 110 by means of FRC. In process 1B, single-pass mode indicates that the accumulated retentate in the intermediate tank 130 is processed through the SPC module 110 one final time and is not returned to the intermediate tank 130 but is diverted to the product 106, whereas recirculation mode indicates that the accumulated retentate is recirculated from the intermediate tank 130 through the SPC module 110 via recirculation stream 105, with the retentate 103 directed back to intermediate tank 130 through product valve 120 (having been placed in POS a).

Several process tables are shown below to illustrate the detailed operation of system 100. Process 1A is a basic hybrid diafiltration process including diafiltration in recirculation mode and final concentration in single-pass mode. In this process, the feed is introduced at a concentration suitable for diafiltration.

TABLE 1A

| Process 1A | | | | |
| --- | --- | --- | --- | --- |
| Process Step | Mode | Product Valve | Feed Pump | Diafiltration Valve |
| I - Load Feed | | | OFF | CLOSED |
| II - Wash Multi-pass | Recirculation | POS "a" | ON | OPENED |
| III - Final Concentration | Single-pass | POS "b" | ON | CLOSED |

In operation, the hybrid diafiltration system 100 effects a multi-step concentration and wash process as summarized in Table 1A. In this process the feed batch is initially at the desired concentration for diafiltration, normally at the optimum concentration (known to those skilled in the art). Referring to Table 1A, Step I begins with loading of the feed batch (not shown) into intermediate tank 130. During Step I the feed pump 141 is OFF and diafiltrate valve 150 is CLOSED; the product valve 120 can be in either position since there is no flow, although it is preferable to place it in POS a. Once the feed batch is loaded, the process proceeds to Step II, the washing step, which is performed in recirculation mode, generally with multiple passes. Recirculation mode means a process step wherein the feed 101 originates from and the retentate 103 returns to intermediate tank 130, which means that the feed stream affects multiple passes through feed pump 140. In contrast, single-pass mode means a process step wherein the feed stream passes only once through feed pump 141. To effect Step II, washing, the feed pump 140 is turned ON, the product valve 120 is placed in POS a, and diafiltration valve 150 is OPENED, inducing permeation and washing of the feed 101. The diafiltration valve 150 (or, alternatively, the pressure of the diafiltrate 102) may be used to modulate the flow rate of diafiltrate 102 to effect "constant volume diafiltration" (i.e., the diafiltrate flow rate is equal to the permeate flow rate) or "variable volume diafiltration" as the process may dictate. If variable volume diafiltration is used, then the concentration of the target solute in the feed batch will change as washing progresses to produce a higher or lower concentration of target solute as desired. As stated earlier, constant volume diafiltration is usually practiced as it consumes the smallest amount of diafiltrate for a specified decontamination factor. Once washing is complete, the process proceeds to Step III, the final concentration step, which is performed in single-pass mode. To affect Step III feed pump 140 is turned ON, diafiltration valve 150 is CLOSED, and product valve 120 is placed in POS b inducing permeation and concentration of the feed 101 to the desired final product concentration in a single-pass. In process 1A, single-pass mode indicates that the washed batch collected in intermediate tank 130 at the end of the washing step is processed through the SPC module 110 one final time and is not returned to the intermediate tank 130 but is diverted to the product 106. Whereas recirculation mode indicates that the accumulated retentate is recirculated from the intermediate tank 130 through the SPC module 110 via recirculation stream 105.

Table IB shown below summarizes an alternative multi-step concentration and wash process, Process 1B. The System 100 of FIG. 1A and system 100' of FIG. 1B can also operate a diafiltration process according to Process 1B in Table 1B. Process 1B is similar to Process 1A, but includes a post-wash step III in recirculation mode with the diafiltration source shut off, before the final concentration step to get the feed concentration to a level that will allow the final concentration to be achieved in single-pass mode. As such, Process 1B has 4 steps. Steps I and II are identical to those of Process 1A, however, once washing is complete, Process 1B proceeds to Step III, the pre-concentration step, which is performed in recirculation mode. To effect Step III feed pump 140 is turned ON (inducing permeation), diafiltration valve 150 is CLOSED, and the product valve 120 is placed in POS a, directing the retentate to intermediate tank 130. As a result, the concentration of feed 101 gradually increases until a certain desired concentration is reached. At that moment, system 100 or system 100' is switched to run in single-pass mode by placing product valve 120 in POS b until the intermediate tank is emptied. The desired concentration can be measured by several techniques known in the art. Process 1B is particularly suitable for processes wherein the desired final concentration is higher than that which can be obtained in a single-pass through SPC module 110 starting from the feed concentration at the end of the washing step.

TABLE 1B

Process 1B

| Process Step | Mode | Product Valve | Feed Pump | Diafiltration Valve |
|---|---|---|---|---|
| I - Load Feed | | | OFF | CLOSED |
| II - Wash Multi-Pass | Recirculation | POS "a" | ON | OPENED |
| III - Post-Wash Concentration | Recirculation | POS "a" | ON | CLOSED |
| IV - Final Concentration | Single-pass | POS "b" | ON | CLOSED |

Process 1C is the same as Process 1A except that there is a pre-wash (initial concentration) step II, before the wash step to get the feed concentration close to the optimum diafiltration concentration. Step II is operated in recirculation mode with the diafiltration source shutoff.

TABLE 1C

Process 1C

| Process Step | Mode | Product Valve | Feed Pump | Diafiltration Valve |
|---|---|---|---|---|
| I - Load Feed | | | OFF | CLOSED |
| II - Pre-Wash Concentration | Recirculation | POS "a" | ON | CLOSED |
| III - Wash Multi-Pass | Recirculation | POS "a" | ON | OPENED |
| IV - Final Concentration | Single-pass | POS "b" | ON | CLOSED |

Figure 2A:
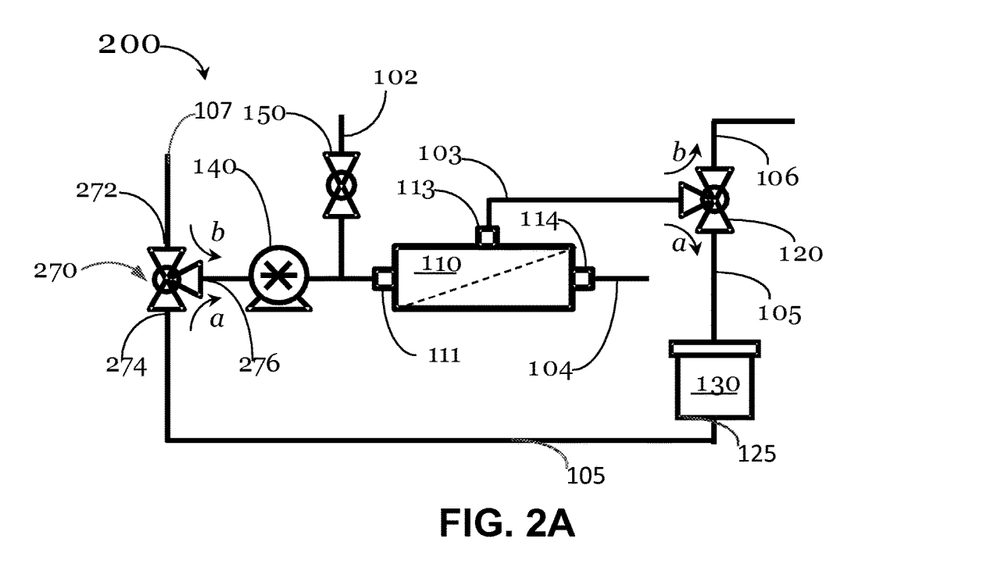
FIG. 2A shows P&ID of the hybrid diafiltration system of FIG. 1A further including a feed valve.

Now referring to FIG. 2A a hybrid diafiltration system 200 similar to hybrid diafiltration system 100 additionally includes a feed valve 270 having a plurality of feed valve inlets 272 and 274 and an outlet 276, the outlet 276 coupled to the feed pump 140. In operation feed valve 270 switchably couples the feed pump 140 to either a feed source 107 (which is external to the recirculation loop 115) through inlet 272 or the intermediate tank 130 outlet 125. System 200 can operate according to process 2A, 2B or 2C described below in more detail.

Referring to Table 2A, Process 2A is similar to Process 1C, except that the Initial concentration step I is performed in single-pass mode. In step I, single-pass mode indicates that the feed valve 270 selects feed source 107, which becomes the feed 101, which is directed to the SPC module 110 and processed without diafiltration (diafiltration valve 150 is CLOSED) into the intermediate tank 130. Steps II and III of Process 2A are identical to Steps II and III of Process 1C: recirculation mode in step II indicates that the accumulated retentate is recirculated from intermediate tank 130 through feed valve 270 (in POS a) to the SPC module 110 via recirculation stream 105 back to recirculation tank 130 through product valve 120 (in POS a), whereas single-pass mode indicates that the accumulated retentate from the intermediate tank 130 is processed through the SPC module 110 one final time and is not returned to the intermediate tank 130 by diverting retentate 103 to the product 106 through product valve 120 (in POS b).

TABLE 2A

Process 2A

| Process Step | Mode | Product Valve | Feed Valve | Feed Pump | Diafiltration Valve |
|---|---|---|---|---|---|
| I - Initial Concentration | Single-pass | POS "a" | POS "b" | ON | CLOSED |
| II - Wash Multi-Pass | Recirculation | POS "a" | POS "a" | ON | OPENED |
| III - Final Concentration | Single-pass | POS "b" | POS "a" | ON | CLOSED |

Process 2B is similar to Process 2A, except that an additional pre-wash concentration step is performed in recirculation mode prior to washing. This step is done when the initial single-pass concentration step does not concentrate the feed 101 sufficiently to reach the desired (optimal) diafiltration concentration.

TABLE 2B

Process 2B

| Process Step | Mode | Product Valve | Feed Valve | Feed Pump | Diafiltration Valve |
|---|---|---|---|---|---|
| I - Initial Concentration | Single-pass | POS "a" | POS "b" | ON | CLOSED |
| II - Pre-wash Concentration | Recirculation | POS "a" | POS "a" | ON | CLOSED |
| III - Wash Multi-Pass | Recirculation | POS "a" | POS "a" | ON | OPENED |
| IV - Final Concentration | Single-pass | POS "b" | POS "a" | ON | CLOSED |

Process 2C is similar to Process 2B, except that an additional post-wash concentration step is performed in recirculation mode prior to the Final Concentration step. This process is used when the single-pass Final Concentration step is not concentrate the feed sufficiently starting from the concentration at the end of the wash step to reach the desired final concentration.

TABLE 2C

Process 2C

| Process Step | Mode | Product Valve | Feed Valve | Feed Pump | Diafiltration Valve |
|---|---|---|---|---|---|
| I - Initial Concentration | Single-pass | POS "a" | POS "b" | ON | CLOSED |
| II - Pre-wash Concentration | Recirculation | POS "a" | POS "a" | ON | CLOSED |
| III - Wash Multi-Pass | Recirculation | POS "a" | POS "a" | ON | OPENED |
| IV - Post-Wash Concentration | Recirculation | POS "a" | POS "a" | ON | CLOSED |
| V - Final Concentration | Single-pass | POS "b" | POS "a" | ON | CLOSED |

Figure 2B:
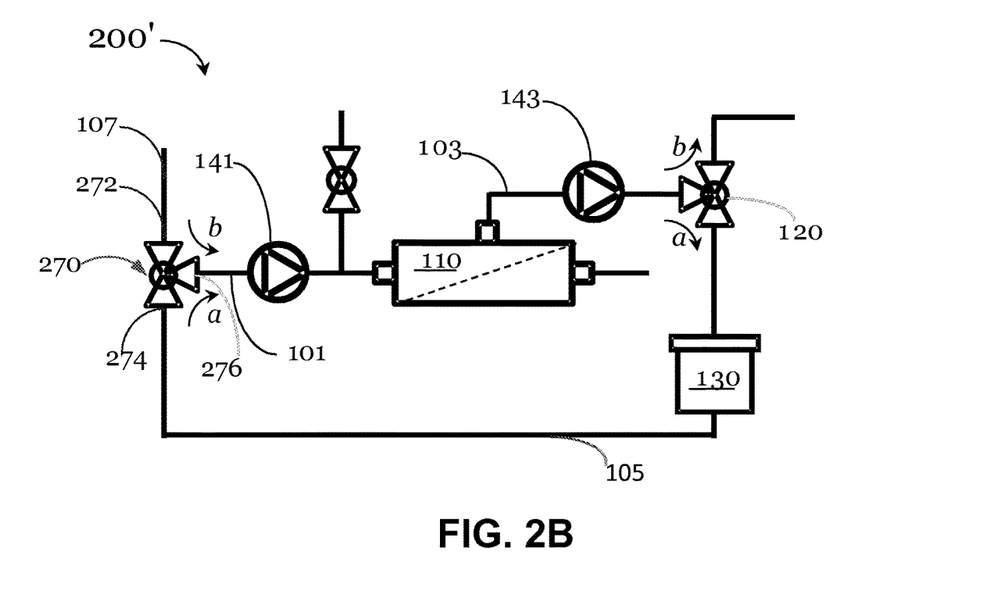
FIG. 2B shows a P&ID of the hybrid diafiltration system of FIG. 1B further including a feed valve.

Now referring to FIG. 2B a hybrid diafiltration system 200' similar to a hybrid diafiltration system 100' additionally includes a feed valve 270 having inlets 272 and 274 and an outlet 276, the outlet 276 coupled to the feed pump 141. In operation the feed valve 270 switchably couples the feed pump 141 to either the feed source 107 through inlet 272 or the intermediate tank 130. System 200' can operate according to process 2A, 2B or 2C as described above.

Figure 3:
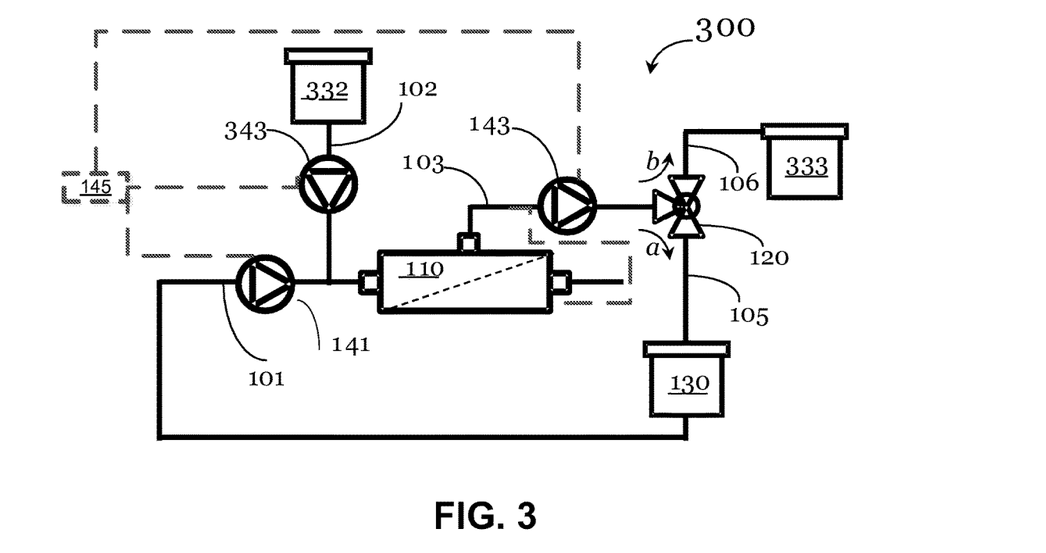
FIG. 3 shows a P&ID of the hybrid diafiltration system of FIG. 1B further including a diafiltrate tank, a diafiltrate pump and a product tank.

Now referring to FIG. 3, a hybrid diafiltration system 300 similar to a hybrid diafiltration system 100' additionally includes a product tank coupled to the product 106, a diafiltration tank which supplies the diafiltrate 102 and a diafiltration pump 343, here a positive displacement diafiltration pump, instead of a diafiltration valve. System 300 can optionally include a Flow Ratio Controller (FRC) 145 which couples the operation of feed pump 141, the retentate pump 143 and the diafiltration pump 343.

In operation, the diafiltration pump operates as a diafiltration valve, but can additionally pressurize the diafiltration stream 102. System 300 can operate according to process 1A, 1B or 1C described above.

Figure 4:
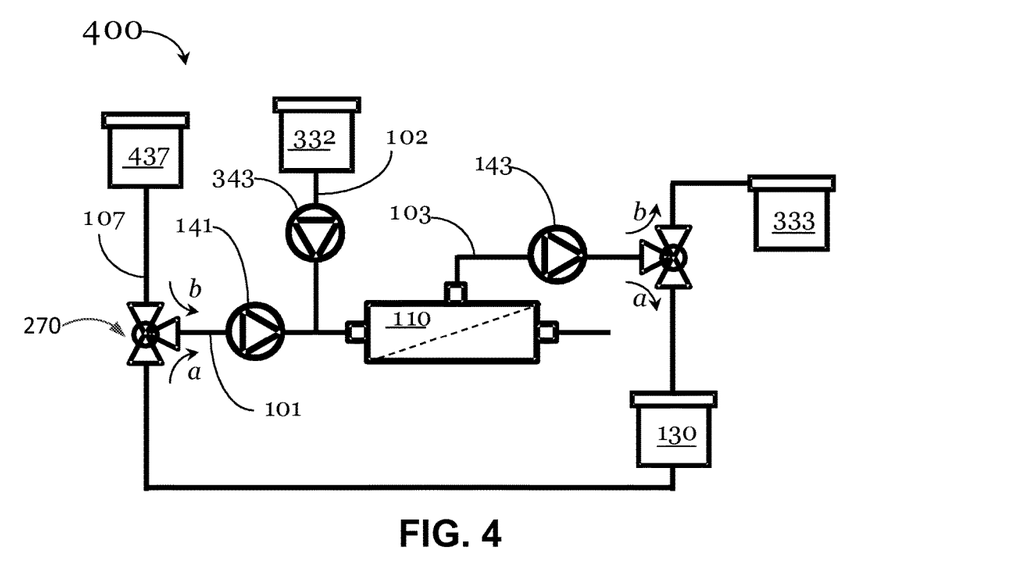
FIG. 4 shows a P&ID of the hybrid diafiltration system of FIG. 2B further including a diafiltrate tank, a diafiltrate pump, a product tank and a feed tank.

Now referring to FIG. 4, a hybrid diafiltration system 400 similar to a hybrid diafiltration system 300 additionally includes a feed tank 437 coupled to the feed stream 107 and the feed valve 270 of system 200. System 400 can operate according to processes 2A, 2B or 2C described above. It is understood that a feed tank can be connected as part of the recirculation loop 115 and would therefore serve the function of the intermediate tank 130. Here feed tank 437 is outside of the recirculation loop 115.

Figure 5:
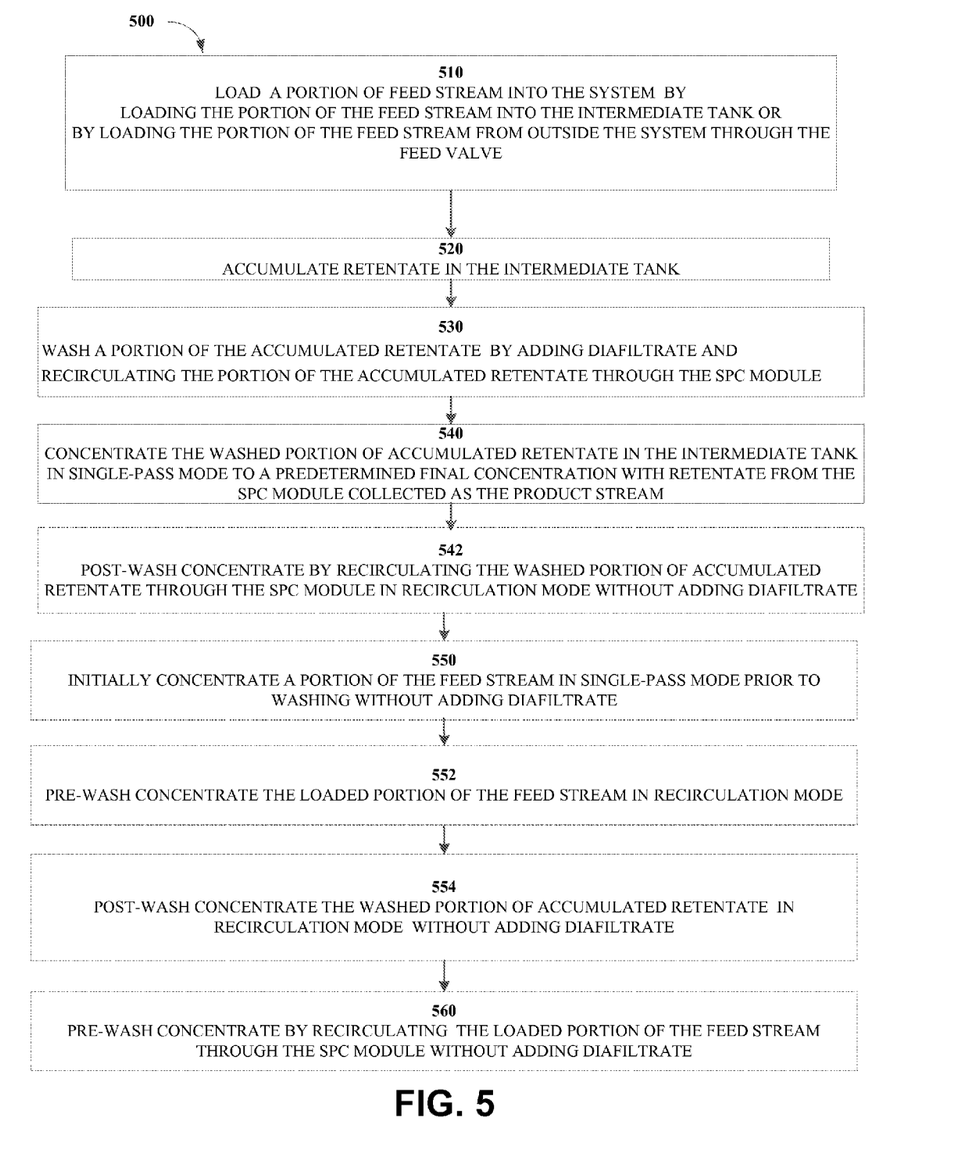
FIG. 5 is a flow diagram of a hybrid diafiltration process according to embodiments disclosed herein.

Now referring to FIG. 5, a flow diagram 500 describes the hybrid diafiltration process for one embodiment using one of the hybrid diafiltration systems described above in conjunction with FIGS. 1A-4. The process operates generally in three main steps:
LOADING Loading an initial portion of the feed stream and processing it through the SPC module;
WASHING Recirculating the retentate through the SPC module with buffer (diafiltrate) addition until the desired decontamination factor is achieved.
FINALLY CONCENTRATING Stopping diafiltration, processing the accumulated retentate in final pass through the single-pass TFF module and diverting the output to the product stream.

It is understood that additional concentration steps can be added or repeated to produce the final desired concentration. In one embodiment, the process starts in step 510, where a portion of feed stream 107 is loaded into the system 100 by loading the portion of the feed stream 107 into the intermediate tank 130 or where there is an optional feed valve 270 and optional feed tank 437 by loading the portion of the feed stream 107 from outside the system through the feed valve 270. At step 520, retentate is accumulated in the intermediate tank 130, and at step 530 a portion of the accumulated retentate is washed by adding diafiltrate and recirculating the portion of the accumulated retentate through the SPC module 110. Finally at step 540, the washed portion of accumulated retentate in the intermediate tank 130 is concentrated in single-pass mode to a predetermined final concentration with retentate from the SPC module 110 collected as the product stream 106. The product stream 106 can be optionally collected in the product tank 333.

In accordance with the processes described above in conjunction with Process Tables 1A-2C, the following optional steps can be performed to optimize the washing process. At step 542, the washed portion of accumulated retentate is post-wash concentrated by recirculating it through the SPC module 110 in recirculation mode without adding diafiltrate. At step 550, a portion of the feed stream is initially concentrated prior to washing in single-pass mode without adding diafiltrate. At step 552, the loaded portion of the feed stream is pre-wash concentrated in recirculation mode. At step 554, the washed portion of accumulated retentate is post-wash concentrated in recirculation mode to a predetermined final concentration with retentate from the SPC module collected as the product stream 106 without adding diafiltrate. At step 560, the loaded portion of the feed stream pre-wash concentrated by recirculating it through the SPC module 110 without adding diafiltrate.

Additional optional steps include controlling a flow ratio between the feed pump 141 and optional retentate pump 143. Another optional step includes adjusting the concentration of the washed portion of accumulated retentate of the intermediate tank to a predetermined intermediate concentration while adding the diafiltrate at non-constant volume to change the concentration of the washed portion of accumulated retentate of the intermediate tank.

All literature and similar material cited in this application, including, patents, patent applications, articles, books, treatises, dissertations and web pages, regardless of the format of such literature and similar materials, are expressly incorporated by reference in their entirety. In the event that one or more of the incorporated literature and similar materials differs from or contradicts this application, including defined terms, term usage, described techniques, or the like, this application controls.

The section headings used herein are for organizational purposes only and are not to be construed as limiting the subject matter described in any way. The descriptions and diagrams of the methods described herein can be performed in any suitable order unless otherwise indicated herein or otherwise clearly contradicted by context.

The claims should not be read as limited to the described order or elements unless stated to that effect. It should be understood that various changes in form and detail may be made without departing from the scope of the appended claims. Therefore, all embodiments that come within the scope and spirit of the following claims and equivalents thereto are claimed.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and are to be construed as OPENED-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed:

1. A hybrid diafiltration system comprising:
   a single-pass TFF (tangential flow filtration) concentration (SPC) module having a feed port, a retentate port and a permeate port;
   a feed pump having an inlet and an outlet, the outlet coupled to the feed port of the SPC module;
   an intermediate tank having an outlet and an inlet, the outlet fluidly coupled to the feed pump inlet;
   a product valve having an inlet and a plurality of product valve outlets, the inlet fluidly coupled to the retentate port of the SPC module;
   wherein a first one of the plurality of product valve outlets is fluidly coupled to the inlet of the intermediate tank;
   wherein a second different one of the plurality of product valve outlets is fluidly coupled to a product stream;
   a system recirculation loop for batch diafiltration comprising fluid connections from:
      the outlet of the intermediate tank to the inlet of the feed pump;
      the outlet of the feed pump to the feed port;
      the retentate port to the inlet of the product valve; and
      the first outlet of the product valve to the inlet of the intermediate tank;
   a diafiltration source fluidly coupled to the system recirculation loop; and
   wherein the product valve switchably fluidly connects the retentate port to the system recirculation loop for batch diafiltration and to the product stream for single pass concentration;
   wherein the single-pass TFF (tangential flow filtration) concentration (SPC) module comprises:
      a plurality of stages, each stage having a plurality of channels; each of the channels has a length, a membrane area, a void volume, a specific membrane area $\sigma_c$ expressed as a ratio of the membrane area to the void volume, and a dimensionless length $\lambda$, expressed as a product of the channel length and the specific membrane area;
      a dimensionless length of the system is greater than about 2,000; and
      a dimensionless length of at least one of the plurality of substantially identical stages is less than about 6,000 to provide relatively short flow paths for individual stages.

2. The system of claim 1 wherein the diafiltration source comprises a diafiltration valve switchably coupling the diafiltration source to one of:
   the feed port of the SPC module;
   the retentate port of the SPC module;
   the intermediate tank; and
   the inlet of the feed pump.

3. The system of claim 1 further comprising a retentate pump disposed between the retentate port and the inlet of the product valve.

4. The system of claim 3, wherein the feed pump and the retentate pump are coupled by a Flow Ratio Controller (FRC).

5. The system of claim 3 further comprising:
   a product tank having an inlet fluidly coupled to the second different one of the plurality of product valve outlets;
   wherein the diafiltration source comprises a diafiltration pump switchably coupling a diafiltration tank to the system recirculation loop at the feed port; and
   wherein the product valve switchably fluidly couples the retentate port of the SPC module to the product tank.

6. The system of claim 1 further comprising a feed valve having a plurality of feed valve inlets and an outlet, the outlet coupled to the feed pump; and
   wherein a first one of the plurality of feed valve inlets is fluidly coupled to the outlet of the intermediate tank;
   wherein a second different one of the plurality of product valve inlets is fluidly coupled to a feed source; and
   wherein the feed valve switchably fluidly connects the feed port to the system recirculation loop for batch diafiltration and to the feed source for single pass concentration.

7. The system of claim 6, further comprising a retentate pump disposed between the retentate port and the inlet of the product valve.

8. The system of claim 7 further comprising a flow ratio controller coupled to the feed pump and the retentate pump.

9. The system of claim 1 further comprising:
   a feed valve having inlets and an outlet, the outlet coupled to the feed pump;
   a feed tank coupled to an inlet of the feed valve;
   a product tank coupled to an outlet of the product valve;
   wherein the diafiltration source comprises a diafiltration pump switchably coupling a diafiltration tank to the recirculation loop;
   wherein the product valve switchably couples the retentate port of the SPC module to one of:
      the product tank; and
      the intermediate tank; and
   wherein the feed valve switchably couples the inlet of the feed pump to one of:
      the feed tank; and
      the intermediate tank.

* * * * *